July 30, 1963 G. A. LALAK 3,099,081
BRAZING JIG
Filed Nov. 21, 1960 3 Sheets-Sheet 1

INVENTOR.
GEORGE A. LALAK
BY
William A. Zalesak
Attorney

July 30, 1963

G. A. LALAK 3,099,081

BRAZING JIG

Filed Nov. 21, 1960

INVENTOR.
GEORGE A. LALAK
BY
William A. Zaluzak
Attorney

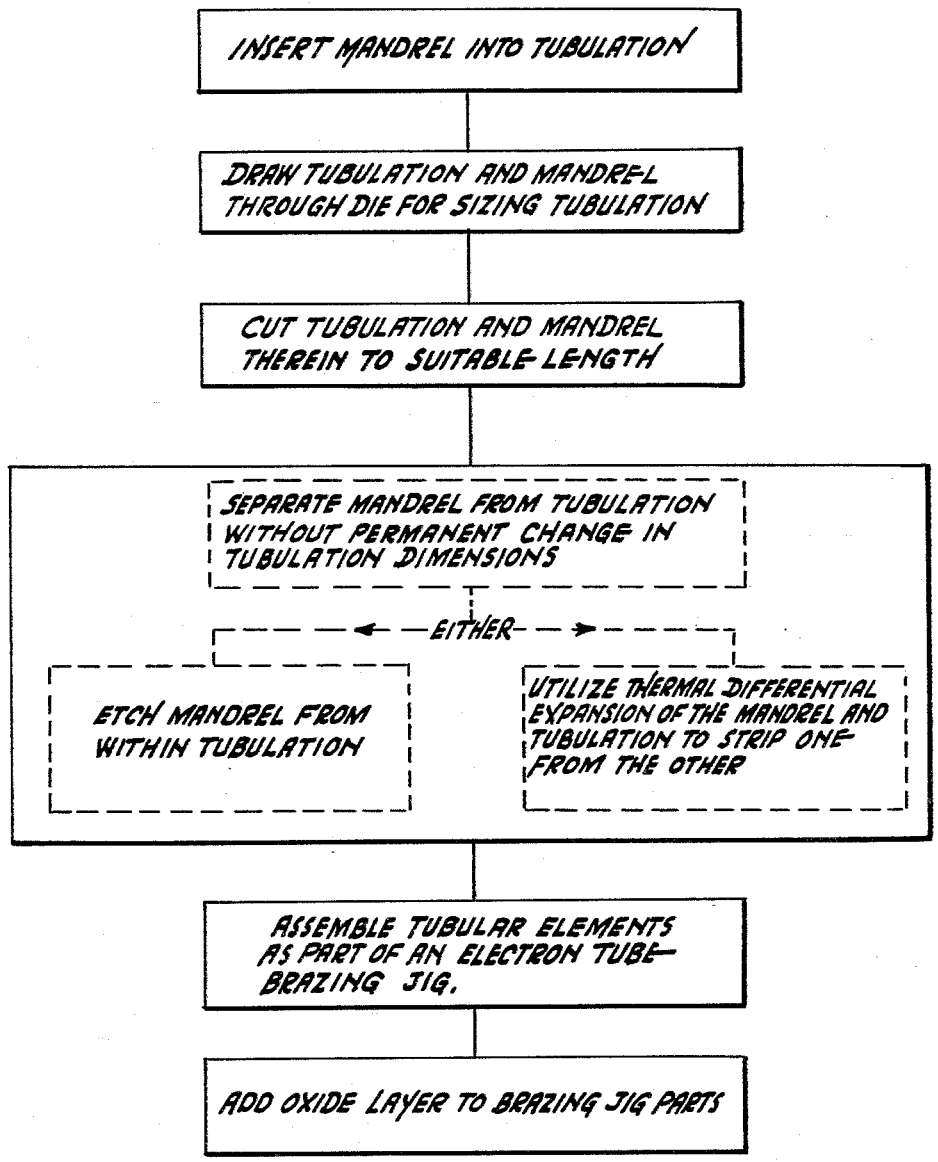

United States Patent Office 3,099,081
Patented July 30, 1963

3,099,081
BRAZING JIG
George A. Lalak, Springfield, N.J., assignor to Radio Corporation of America, a corporation of Delaware
Filed Nov. 21, 1960, Ser. No. 70,820
12 Claims. (Cl. 29—423)

This invention relates to a method of fabricating a brazing jig for use in the manufacture of electron tubes.

The fabrication of one type of electron tube, hereinafter described, employs a jig including a plurality of coaxial tubular elements for supporting a plurality of tube parts in predetermined loose contacting relationship during brazing operations. To insure that the tube parts are brazed together in proper spaced relation to each other, it is essential that the jig be fabricated within very exacting dimensional tolerances.

In one jigging application, for example, the dimensional tolerances on the tubular elements in a brazing jig are but .0005 inch. Moreover, to prevent brazing of the tube parts to the jig, it is the practice to oxidize the surface of the jig parts, the oxide coating being non-wettable by the material used for brazing. It has been found, however, that the thickness of the oxide coating may vary between .0001–3 inches during the useful life of the jig, and in order to maintain the tubular elements within the tolerance limits, it is necessary that the tolerances on the unoxidized tubular element dimensions be but .0002 inch.

A problem in the prior art has been the difficulty of obtaining tubular elements of the required dimensional accuracy. Commercially-available tubular elements are normally prepared by inserting a mandrel of accurate diameter into a tubulation, 10 or 20 feet in length, and drawing the mandrel and tubulation through a die. The outside diameter, the inside diameter, and the wall thickness of the tubulation are reduced to desired dimensions, the tubulation being drawn tightly about the mandrel. To remove the mandrel from the tubulation, a rotary swaging machine is employed. The swaging machine hammers and reduces the wall thickness of the tubulation whereby the inner and the outer diameters of the tubulation are slightly increased. The mandrel diameter is unaffected, and the tubulation may be slid off the mandrel. After the tubulation is separated from the mandrel, the tubulation is cut to the desired tubular element lengths.

It is known that while the diameter and the wall thickness of the tubulation may be controlled to a high degree of accuracy during the drawing operation, the close dimensional control is lost during the swaging, tubulation wall-expanding operation. The result of this is that present commercially-available tubulations cannot be held to the close tolerance required of tubular elements used in electron tube jigs. This, in turn, results in the necessity of individually sizing and reworking the tubulations to the exact sizes required prior to the assembly of the tubular elements within the jigs. This extra handling and working of the jig elements is an inefficient and costly procedure.

It is therefore an object of this invention to provide an improved and inexpensive method for fabricating jigs having very accurately dimensioned tubular elements.

Another object of the invention is to provide an improved method of fabricating accurately dimensioned tubular elements for use in brazing jigs.

For achieving these objects, a mandrel of a first material is inserted into a tubulation of a second material to be used as a jig part, and the assembly drawn through a die to size the tubulation, as described. In accordance with this invention, the tubulation with the mandrel therein is cut and machined to the exact lengths required of the tubular elements. After cutting, the mandrels and tubular elements are separated. To accomplish this, the mandreals are etched out of the tubular elements by an agent which attacks only the mandrel, the agent having no effect on the tubular elements.

An alternate separating method, possible if the mandrel material has a smaller thermal coefficient of expansion than the tubular element material, is to utilize the differential rate of expansion of the two materials. Upon heating, the tubular elements may be stripped off the mandrels.

Neither separating method affects the dimensional accuracy of the tubular elements, and it is thus possible to provide tubular elements having very small dimensional variations therebetween. In the finished, oxidized brazing jig, it is necessary that the wall thicknesses of the tubular elements fall within specified upper and lower dimensional limits. Although the spread between these limits is very small, as mentioned, the tubular elements are prepared by the methods of this invention so that the range of tubular element wall thicknesses falls within the lower half of the dimensional variation spread permitted in the finished jig. The tubular elements are assembled as parts of a brazing jig, as will be described hereinafter, and the jig surfaces are oxidized in an oxidizing atmosphere. The oxide coating adds to the wall thickness of the tubular elements, whereby the range of wall thicknesses is raised from the lower to the central range of allowable wall thicknesses. The centering of the tubular element dimensions within the allowable dimensional limits of the brazing jig allows for subsequent increase or decrease of the oxide coating during the life of the jig, the dimensions of the tubular elements nevertheless staying within dimensional tolerance.

In the drawings:

FIG. 8 is a flow chart showing the method steps of fabricating brazing jigs in accordance with this invention.

Figure 1:
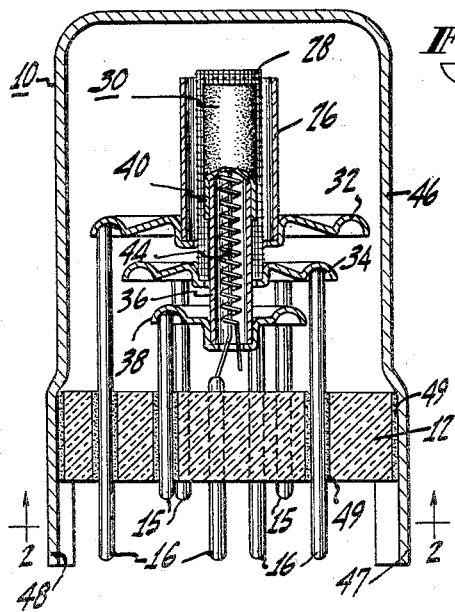
FIG. 1 is a longitudinal section of an electron tube suitable for assembly in a brazing jig which may be fabricated in accordance with this invention.
Figure 2:
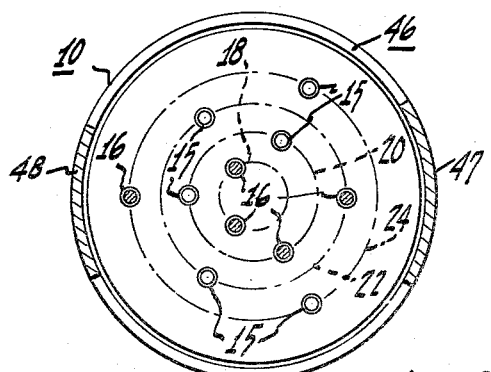
FIG. 2 is a transverse section taken along line 2—2 of FIG. 1.

In FIGS. 1 and 2, an electron tube 10, adapted to be fabricated in the brazing jig according to the invention, is shown. The tube 10 includes a ceramic disk header 12 having a plurality of bores therethrough. A plurality of electrode support conductors 15 and lead-in conductors 16 are sealed in vacuum-tight relation in the bores.

As shown in FIG. 2, the bores, and hence conductors 15 and 16, are arrayed in four concentric circles 18, 20, 22 and 24, shown in phantom. Three bores are disposed in 120°, equidistant, relation on each of the circles. The bores in adjacent circles are angularly displaced 60° to provide maximum spacing therebetween.

The electron tube 10 comprises coaxial cylindrical anode, grid and cathode electrodes 26, 28 and 30, respectively. The anode 26 is mounted on a radially extending flange 32, which is in turn mounted on one lead-in conductor 16 and two support conductors 15 which extend into bores on the outer circle 24. The grid electrode 28 is similarly mounted on a radially extending flange 34 which is in turn mounted on one lead-in conductor 16 and two support conductors 15 which extend into bores on the circle 22. The cathode 30 comprises a tubular cathode support sleeve 36 mounted on a radially extended flange 38, which is supported on one lead-in conductor 16 and two support conductors 15 extending into bores on the circle 20. The cathode 30 also includes a tubular emissive sleeve 40 which is disposed over the support sleeve 36, and which is coated with a suitable electron emissive material. A coiled heater 44 is disposed in the cathode support sleeve 36 and connects to a pair of lead-in conductors 16 which are sealed through two bores on the inner circle 18. A vacuum-tight envelope is provided by a cup-shaped shell 46 which is sealed to the periphery of the ceramic disk header 12. The shell 46 includes a pair of extending arcuate tongues 47 and 48 which serve to protect the externally extending conductors 16 and facilitate socketing of the tube. Both of the conductors 16 connecting to the heater 44 extend through the ceramic header 12 and form terminal prongs. Only the one lead-in conductor 16 of each of the set of three conductors connected respectively to the anode, grid, and cathode flanges extend through and beyond the ceramic header 12 to provide terminal prongs.

In one form of the tube 10, the conductors 15 and 16 and the side rods of the grid 28 are made of molybdenum; the cathode support sleeve 36 is principally "Nichrome" alloy; the anode 26 is nickel; and the flanges 32, 34, and 38 are steel.

In the fabrication of the electron tube 10, a metallic coating 49, such as molybendum, is applied to the ceramic disk header 12 on its outer periphery and on the walls of the bores therein. Such a coating may be applied by any suitable-known metallizing process. It has been found expedient to coat all surfaces of the ceramic disk header 12 with molybdenum and then grind the two planar surfaces thereof to remove the coating therefrom. Thus, only the outer periphery and the walls of the bores are left with a metallized coating 49.

The support flanges 32, 34 and 38 are coated, such as by electroplating, with a brazing material, such as copper. The conductors 15 and 16 are either similarly electroplated or else have washers of brazing material fitted over them and against the header 12. Thus, when the tube parts are assembled, and the assembly is heated to a sufficiently high temperature, vacuum-tight brazed seals are effected between the conductors 15 and 16 and the ceramic disk header 12. Also, the flanges 32, 34 and 38 are brazed to their respective electrodes and conductors. The shell 46 is sealed to the periphery of the ceramic header 12 in a final hard soldering step. The details of the brazing process will be more fully described with reference to FIGS. 3 and 4.

Figure 3:
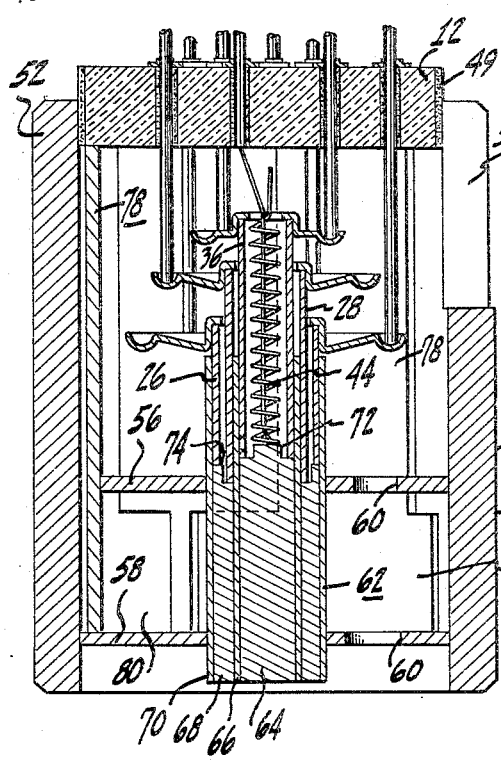
FIG. 3 is a longitudinal section of a brazing jig which may be fabricated in accordance with this invention in which certain parts of the electron tube of FIG. 1 are disposed.
Figure 4:
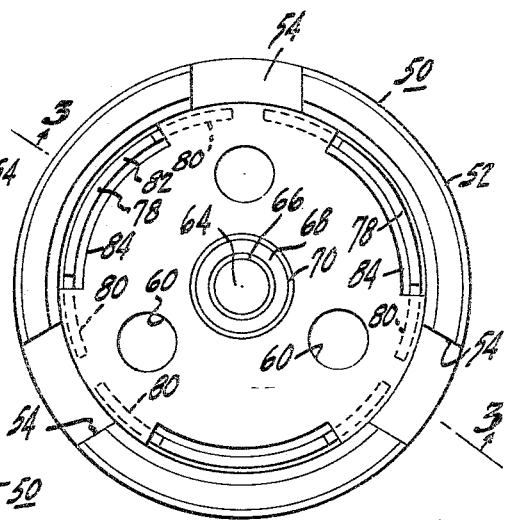
FIG. 4 is a top end view of the brazing jig of FIG. 3.

FIGS. 3 and 4 illustrate one form of a brazing jig which may be made according to my invention. This jig is particularly suitable for assembling the electron tube shown in FIGS. 1 and 2. The jig 50 comprises an outer generally cylindrical hollow housing 52. The housing 52 need not be circumferentially continuous at all longitudinal points. It is preferred that the housing 52 be provided with a plurality of longitudinal slots 54 therein to facilitate the flow therethrough of a reducing gas such as hydrogen during the brazing operation. The longitudinal slots 54 extend from the top of the housing 50 downwardly to any desired extent so long as the housing remains sufficiently rigid.

Two centrally apertured support disks 56 and 58 are transversely mounted within the cylindrical housing 52 in interference fits. One or more openings 60 are provided in both the upper support disk 56 and the lower support disk 58 for the purpose of facilitating an adequate flow of the reducing gas atmosphere through the jig during the brazing operation.

A jigging assembly 62 is disposed through the central apertures of the support disks 56 and 58 and is mounted therein in an interference fit. The jigging assembly 62 comprises a central post 64, an inner jigging cylinder 66, a spacer cylinder 68, and an outer jigging cylinder 70. The inner and outer jigging cylinders 66 and 70 extend upwardly a predetermined distance beyond the upper ends of the center post 64 and the spacer cylinder 68 to partially expose the cylindrical surfaces thereof for the purpose of receiving tube parts thereon. The four elements 64, 66, 68 and 70 of the jigging assembly 62 are assembled with interference fits therebetween.

As shown in FIG. 3, the jigging assembly 62 is adapted to receive the cathode support sleeve 36, the grid 28, and the anode 26 in a desired spaced relationship. The inner jigging cylinder 66 is of such internal diameter that the cathode support sleeve 36 is snugly received therewithin. The outer diameter of the inner jigging cylinder 66 is such that the grid 28 is snugly received therearound. The inner diameter of the outer jigging cylinder 70 is such that the anode 26 is snugly received therewithin. The wall thickness of the inner jigging cylinder 66 thus determines the spacing between the cathode support sleeve 36 and the grid 28. The wall thickness of the spacer cylinder 68 is such that the desired grid-to-anode spacing is provided. The center post 64 and the spacer cylinder 68 are provided with stepped ends 72 and 74, respectively, so as to properly longitudinally locate the anode 26, grid 28, cathode sleeve 36, and the heater coil 44.

Figure 5:
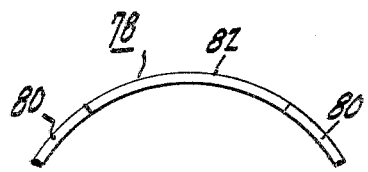
FIGS. 5 and 6 are end and side elevation views, respectively, of the T-shaped inserts of the jig of FIGS. 3 and 4.
Figure 6:
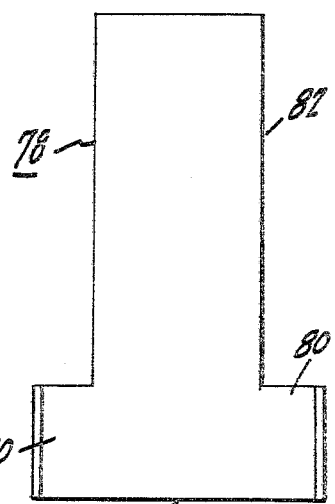

The ceramic disk header wafer 12 of the electron tube 10 is received within the cylindrical housing 52 to position it concentrically with respect to the electrodes 26, 28 and 36. The ceramic header wafer 12 is supported on the ends of a plurality of elongated sheet metal inserts 78. The inserts 78 are generally arcuate in transverse cross section as shown in FIG. 5 and are T-shaped so as to include wing portions 80 and a leg portion 82, as shown in FIG. 6.

Three of the T inserts are provided in the jig 50 and are disposed within the cylindrical housing 52 with their wing portions 80 between the upper and lower support disks 56 and 58. The upper support disk 56 is provided with three arcuate slots on peripheral recesses 84 through which the leg portions 82 of the inserts 78 extend. The longitudinal upward extent of the T inserts 78 is such as to longitudinally support the ceramic disk header 12 in a desired axial relationship with respect to the electrodes 26, 28 and 36. By virtue of the relatively long bottom surface 86 of the inserts 78, the inserts are easily maintained in a precise upright relationship. Also, by virtue of the captivation of the wing portion 80 of the inserts between the upper and lower support disks 56 and 58, the inserts are prevented from falling out of the jig during handling thereof. Yet, the inserts 78 are suitably loosely contained within the jig so as to freely accommodate any differential expansion.

In the assembly and fabrication of the electron tube 10, the jig 50 is oriented with the open end up. As shown in FIG. 3, an anode 26, a grid 28, and a cathode support sleeve 36 are loaded into contact with the inner and outer jigging elements 66 and 70. Such loading may be facilitated with a loading device (not shown) which is jigged against the rim of the housing.

An anode flange 32, a grid flange 34, and a cathode flange 38 are deposited in the order named on their respective electrodes. Alternatively, the flanges and electrodes may be assembled as units and simultaneously placed in the jig, the anode and its flange being inserted in the jig first. The two legs 76 of the heater coil 44 are attached to a pair of lead-in conductors 16 which are inserted in proper bores in the ceramic disk header 12. The remaining nine conductors, one lead-in conductor 16, and two support conductors 15 for each electrode flange, are loaded into their proper bores in the header 12. The header 12 is then placed in the housing 52 on top of the inserts 78. The conductors 15 and 16 are such that they fit snugly within the bores 14 but are nevertheless slidable therein so that they may drop downwardly and into contact with their respective electrode flanges. Prior to such assembly, the ceramic header 12 has been provided with metallic coatings 49 on the outer periphery and the walls of the bores as hereinbefore described. The conductors 15 and 16 and the three electrode support flanges 32, 34 and 38 have also been previously provided with suitable metallic coatings (not shown).

The assembly of the jig 50 and the electron tube parts shown in FIG. 3 are then inserted in a furnace and heated in a reducing atmosphere to a temperature sufficient to melt the brazing material on the conductors 15 and 16 and on flanges 32, 34 and 38 and fuse the electron tube parts together.

Following this brazing operation, the cathode emissive sleeve 40 is placed over the cathode support sleeve 36 and the envelope shell 46 is fitted into contact with the ceramic header 12. A preformed ring of a hard solder is positioned in contact with the tube shell 46 and the ceramic header periphery. This assembly results in a complete tube assembly which is then subjected to a final furnace heating in vacuum. This final processing step serves to evacuate the tube, sinter the cathode emissive sleeve 40 to the cathode support sleeve 36, and solder the shell 46 to the periphery of the header 12. The temperature employed in this final step is substantially below the previous brazing temperature. Accordingly, the previously made brazes are not adversely affected.

As mentioned, the jigging elements including jigging cylinders 66 and 70, center post 64 and spacer cylinder 68 are adapted to receive the cathode support sleeve 36, the grid 28, and the anode 26 in desired spaced relationship. Because of this arrangement, it is essential that the jigging elements referred to be held to very exact dimensional tolerances to insure proper spacing of the electrodes of the finished tube.

In one embodiment of the tube shown in FIG. 1, for example, the desired spacing between the grid 28 and the cathode support sleeve 36 is .004 inch and the spacing between the grid 28 and the anode 26 is .007 inch with a tolerance of but .0005 inch for each dimension. Such small electrode spacings and tolerances are required for proper electrical performance of electron tubes of the type shown.

Center post 64 is a solid member and is machined to size by conventional means. Because of the relatively thick walls of spacer cylinder 68, it too is prepared by machining. Jigging cylinders 66 and 70, however, have such thin walls that preparation of these elements by machining techniques is prohibitively expensive.

The method found most satisfactory for producing such thin wall tubulations is to draw relatively thick wall tubulations having a mandrel therein to the required dimensions. Because of the rotary swaging process employed in the prior art to separate the tubulation from the mandrels, however, the dimensional control maintainable during the drawing operation is largely lost during the mandrel-tubulation separating operation. If the tubulations, as removed from the mandrels by the swaging process have wall thicknesses which are oversize, elaborate polishing and reaming techniques must be employed to properly size the tubulations. Conversely, if the wall thicknesses are too small, salvage of the tubulations is not possible and the tubulations have to be discarded. Moreover, other known tubulation fabricating methods such as extrusion and cup drawing are equally inadequate because of the large expense of these methods and of the inability of these methods to produce tubulations having the necessary dimensional accuracy.

For providing inexpensive and highly accurate jigging cylinders in accordance with this invention, a tubulation with a mandrel therein is drawn through a die to squeeze and size the tubulation about the mandrel. By these means, the tubulation may be very accurately sized to predetermined dimensions and shape.

The tubulation with the mandrel therein is then cut and machined to the lengths required of the jigging cylinders. In the prior art, the mandrel is first removed from the tubulation and the tubulation cut to lengths afterwards. This sequence is necessary because tubulations of the small lengths required of the jigging cylinders cannot be conveniently or economically processed by existing type mandrel-removing swaging machines. An advantage to cutting the tubulation with the mandrel therein in accordance with this invention is that the mandrel serves as a support for the tubulation walls to prevent deformation thereof during the cutting operation. Moreover, removal of the mandrel from the tubulation according to the methods of this invention is facilitated when the tubulations and the mandrels therein are of short length.

For separating the mandrels from the tubulations without disturbing the closely held dimensions of the drawn and sized tubulations, the mandrel may be etched from the tubulation, an etching agent being selected which dissolves the mandrel while having no effect on the tubulation.

In one embodiment, the tubulation is made of an alloy which is approximately 80% nickel and 20% chromium, with trace impurities. The mandrel is made of steel music wire. An etching solution which will dissolve the steel mandrel while not attacking the tubulation comprises a solution made from the following formula:

| | | |
|---|---|---|
| Concentrated nitric acid | ml | 50 |
| Cupric nitrate | g | 15 |
| Disodium ethylenediamine tetra acetate | g | 0.5 |
| Distilled water | ml | 150 |

Another method for separating the mandrel from the tubulation without permanent change in dimensions of the tubulation is to utilize the difference in thermal expansion between the nickel-chromium alloy and the steel music wire. The coefficient of thermal expansion of the former is greater than that of the latter, and upon heating, the tubulation will expand away from the mandrel.

Figure 7:
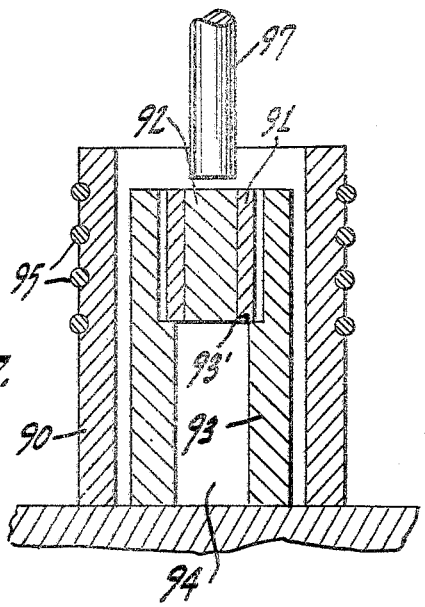
FIG. 7 is a longitudinal section of a jig suitable for separating a mandrel from a tubulation drawn tightly therearound, in accordance with this invention.

In FIG. 7 is shown a jig for stripping the mandrel from within the tubulation upon heating. The jig comprises a container 90 adapted to receive a cut tubulation 91 containing a mandrel 92 therein. Annular step 93' of the tubing support 93 provides support only for tubulation 91, the mandrel 92 being suspended over the hole 94. A coil 95 is wound about the upper portion of container 90, as shown, the ends of the coil being connected to an electrical energy source, not shown.

Upon passage of current through the coil, the mandrel and tubulation are heated with the result that tubulation 91 expands more than mandrel 92. A punch 97 is then actuated downwardly forcing mandrel 92 out of the tubulation 91 and into hole 94, thereby separating the mandrel and tubulation.

In another embodiment, the tubulation is made of an alloy which is approximately 82% iron, 10% molybdenum, and 8% aluminum, with a trace of zirconium. The mandrel is made of an alloy which is approximately 2% beryllium and 98% copper. A suitable etching agent comprises a solution made from the following formula:

| | | |
|---|---|---|
| Sodium dichromate | g | 10 |
| Concentrated nitric acid | ml | 100 |

The tubulation has a thermal coefficient of expansion which is very close to that of the beryllium-copper alloy, and the method of mandrel-tubulation separation utilizing differential thermal expansion of the materials may not be employed in this instance.

The accurately dimensioned jigging cylinders separated from their mandrels by the methods described above are then assembled along with the other jigging elements to provide a brazing jig as shown in FIGS. 3 and 4.

Subsequent to jig assembly, the jig is placed in a hydrogen furnace and heated for providing an oxide layer on the jig parts to prevent sticking of the tube parts thereto during the brazing operation. For controlling the amount of oxidization, the hydrogen is bubbled through water at room temperature to provide a water saturated atmosphere which may be readily duplicated in the preparation of different batches of jigs. In one embodiment, the furnace is at a temperature of 1150° C. and the jigs are kept therein for one half hour. The oxide layer added to the jig parts is of the order of .0001 inch.

During use of the jig in the fabrication of electron tubes of the type shown in FIG. 1, the jig is inserted into a hydrogen brazing furnace for brazing together the tube parts of each tube fabricated within the jig. Each time the jig is subjected to the brazing operation, the oxide coating on the jig parts will be either increased or decreased depending upon the dew point of the hydrogen atmosphere used in the brazing furnaces. That is, a dry atmosphere will result in a reduction of thickness of the oxide coating, while a wet atmosphere will result in an increase thereof.

In one embodiment, the tubulations are drawn through the dies to a size so that the tubulation outer diameters are not greater than .0002 inch, nor less than the smallest jigging cylinder outer diameters allowable in the finished, oxidized brazing jig. Since the largest allowable jigging cylinder outer diameter is .0005 inch larger than the smallest allowable outer diameter, the increase in the outer diameter of the jigging cylinder by about .0001 inch due to the addition of the oxide layer thus does not bring the outer diameter out of limits. Moreover, slight changes in the thickness of the oxide layer during the life of the jig may thereby be tolerated without exceeding the dimensional tolerances of the jig.

In one embodiment of this invention, given by way of example, the desired or nominal inner diameter of jigging cylinder 66 is .056 inch and the desired outer diameter is .065 inch. The tolerances on the inner diameter are +.0005 and —0, and the tolerances on the outer diameter are +0 and —.0005. The tubulation for this jigging cylinder is prepared by the methods described so that the inner diameter of the tubulation is .0565 inch with tolerances of +0 and —.0002, and the outer diameter is .0645, with tolerances of +.0002 and —0. The oxidizing process subtracts about .0001 to .0002 inch from the inner diameter of the jigging cylinder and adds about the same to the jigging cylinder outer diameter; hence, the oxide layers may vary at least + or —.0001 during the life of the jig, the jigging cylinder diameters remaining, nevertheless, within the .0005 inch tolerances.

What is claimed is:

1. The method of making a jig including a tubular portion having a dimension within predetermined limits which comprises drawing a tubulation of a first material having a mandrel in said tubulation of a second material through a die for sizing said tubulation within limits smaller than said predetermined limits, cutting said tubulation and said mandrel therein together to a length suitable for use in said jig, removing said tubulation from said mandrel without permanent change in dimensions of said tubulation, assembling said tubulation as an element of said jig, and adding an oxide layer to said tubulation for centering said dimension within said predetermined limits.

2. The method of making a jig including a tubular portion having a dimension within predetermined limits which comprises drawing a tubulation of a first material having a mandrel in said tubulation of a second material through a die for sizing said tubulation within limits smaller than said predetermined limits, removing said tubulation from said mandrel without permanent change in dimensions of said tubulation, assembling said tubulation as an element of said jig, and adding an oxide layer to said tubulation for centering said dimension within said predetermined limits.

3. The method of making a jig including a tubular portion having a predetermined dimension which comprises drawing a tubulation of a first material having a mandrel therein of a second material through a die for sizing said tubulation to a dimension slightly less than said predetermined dimension, etching said mandrel from within said tubulation, assembling said tubulation as an element of said jig, and adding an oxide layer to said tubulation for increasing said sized dimension to said predetermined dimension.

4. The method of making a jig including a tubular portion comprising inserting a mandrel of a first material into a tubulation of a second material having a larger thermal coefficient of expansion than said first material, drawing said tubulation and said mandrel therein through a die for sizing said tubulation to predetermined inner and outer dimensions, cutting said tubulation and said mandrel therein to predetermined lengths, heating said tubulation and said mandrel and utilizing the thermal differential expansion between said first and said second materials for stripping said tubulation from said mandrel, assembling said tubulation as an element of said jig, and adding an oxide layer to said tubulation.

5. The method of making a jig including a tubular portion comprising inserting a mandrel of a first material into a tubulation of a second material, drawing said tubulation and said mandrel therein through a die for sizing said tubulation to predetermined inner and outer dimensions, cutting said tubulation and said mandrel therein to predetermined lengths, etching said mandrel from within said tubulation, assembling said tubulation as an element of said jig, and adding an oxide layer to said tubulation.

6. The method of making a jig including a tubular portion having a wall thickness not less than a predetermined thickness and not greater than a predetermined first tolerance over said predetermined thickness, said method comprising inserting a mandrel of a first material into a tubulation of a second material having a larger thermal coefficient of expansion than said first material, drawing said tubulation and said mandrel therein through a die for sizing the wall of said tubulation to a thickness not greater than a second tolerance over said predetermined thickness, said second tolerance being smaller than said first tolerance, cutting said tubulation and said mandrel therein to predetermined lengths, heating said tubulation and said mandrel, utilizing the thermal differential expansion between said first and said second materials for stripping said tubulation from said mandrel, assembling said tubulation as an element of said jig, and adding an oxide layer to said tubulation for increasing said wall thickness, said wall thickness remaining within said first tolerance.

7. The method of fabricating a jig including a tubular portion having a predetermined dimension within upper and lower tolerances which comprises drawing a tubulation having a mandrel therein through a die for sizing said tubulation within said tolerances and near said lower tolerance, cutting said tubulation and said mandrel therein to a length suitable for use in said jig, removing said tubulation from said mandrel without permanent change in said dimension of said tubulation, assembling said tubulation as an element of said jig, and adding an oxide layer to said tubulation for increasing said dimension to a value midway between said upper and lower tolerances.

8. The method of fabricating a jig including a tubular portion having a predetermined dimension within upper and lower tolerances which comprises drawing a tubulation having a mandrel therein through a die for sizing said tubulation within said tolerances and near said lower tolerance, removing said tubulation from said mandrel without permanent change in said dimension, assembling said tubulation as an element of said jig, and adding an oxide layer to said tubulation for increasing said dimension to a value midway of said upper and lower tolerances.

9. The method of fabricating a jig including a tubular portion composed of a nickel-chromium alloy, said tubular portion having a dimension not less than a predetermined dimension and not greater than .0005 inch over said predetermined dimension, said method comprising drawing a tubulation and a steel mandrel therein and in contact therewith through a die for sizing said tubulation to a dimension not greater than .0002 inch over said predetermined dimension, cutting said tubulation and said mandrel therein to a predetermined length, etching said mandrel from within said tubulation without change in dimensions of said tubulation, assembling said tubulation as an element of said jig, and adding an oxide layer to said tubulation, said sized dimension remaining less than .0005 inch over said predetermined dimension.

10. The method of fabricating a jig including a tubular portion composed of a nickel-chromium alloy, said tubular portion having a dimension not less than a predetermined dimension and not greater than .0005 inch over said predetermined dimension, said method comprising drawing a tubulation and a steel mandrel therein and in contact therewith through a die for sizing said tubulation to a dimension not greater than .0002 inch over said predetermined dimension, cutting said tubulation and said mandrel therein to a predetermined length, removing said mandrel from within said tubulation without change in dimensions of said tubulation, assembling said tubulation as an element of said jig, and adding an oxide layer between .0001–.0002 inch thick to said tubulation for centering said dimension within its limits.

11. The method of fabricating a jig including a tubular portion composed of nickel chromium alloy, said tubular portion having a dimension not less than a predetermined dimension and not greater than .0005 inch over said predetermined dimension, said method comprising drawing a tubulation and a steel mandrel therein through a die for sizing said tubulation to a dimension not greater than .0002 inch over said predetermined dimension, cutting said tubulation and said mandrel therein to a predetermined length, heating said cut tubulation and mandrel, stripping said tubulation from said mandrel without permanent change in dimensions of said tubulation, assembling said tubulation as an element of said jig, and adding an oxide layer to said tubulation, said sized dimension remaining less than .0005 inch over said predetermined dimension.

12. The method of fabricating a jig including a tubular portion composed of an iron, molybdenum, aluminum alloy, said tubular portion having a dimension not less than a predetermined dimension and not greater than .0005 inch over said predetermined dimension, said method comprising drawing said tubulation having a beryllium-copper alloy mandrel therein through a die for sizing said tubulation to a dimension not greater than .0002 inch over said predetermined dimension, cutting said tubulation and said mandrel therein to a predetermined length, etching said mandrel from within said tubulation without change in dimensions of said tubulation, assembling said tubulation as an element of said jig, and adding an oxide layer to said tubulation, said sized dimension remaining less than .0005 inch over said predetermined dimension.

References Cited in the file of this patent
UNITED STATES PATENTS

| | | |
|---|---|---|
| 2,022,234 | Everett | Nov. 26, 1935 |
| 2,047,555 | Gardner | July 14, 1936 |
| 2,293,455 | Disch | Aug. 18, 1942 |
| 2,619,438 | Varian | Nov. 25, 1952 |
| 2,756,709 | Coonrod | July 31, 1956 |
| 2,896,064 | Maloney | July 21, 1959 |